United States Patent [19]
MacFetrich

[11] 3,858,848
[45] Jan. 7, 1975

[54] FISH TAPE
[75] Inventor: Robert H. MacFetrich, Charlotte, N.C.
[73] Assignee: Jet Line Products, Inc., Matthew, N.C.
[22] Filed: Apr. 26, 1973
[21] Appl. No.: 354,805

[52] U.S. Cl.. 254/134.3 FT, 15/104.3 SN, 403/212, 403/275, 403/277
[51] Int. Cl. ............................................. E21c 29/16
[58] Field of Search ............ 254/134.3 R, 134.3 FT; 15/104.3 SN; 403/275, 209, 212, 276, 277, 282, 302; 57/140 C; 29/203 D

[56] References Cited
UNITED STATES PATENTS

| | | | |
|---|---|---|---|
| 2,040,992 | 5/1936 | Harris | 403/275 X |
| 2,750,152 | 6/1956 | Schinske | 254/134.3 FT |
| 2,799,598 | 7/1957 | Biefeld et al. | 57/140 C |
| 3,110,478 | 11/1963 | Bostick | 15/104.3 SN |
| 3,100,924 | 8/1963 | Trier et al. | 403/275 |
| 3,102,715 | 9/1963 | Weitzel | 254/134.3 FT |
| 3,367,686 | 2/1968 | Kurz | 403/277 |
| 3,426,395 | 2/1969 | Sahm | 403/212 |
| 3,443,374 | 5/1969 | Carnevale | 57/149 |
| 3,512,223 | 5/1970 | Willinger | 403/209 |
| 3,716,913 | 2/1973 | Masino et al. | 29/203 D |

Primary Examiner—Othell M. Simpson
Attorney, Agent, or Firm—Johnson, Dienner, Emrich & Wagner

[57] ABSTRACT

The present invention provides a fish tape for drawing electric wires into conduits and the like The body of the fish tape comprises a unitary sheath or jacket of plastic, such as polyethylene, extruded onto a small diameter central core of fine stranded polyester fibers. The core has great strength in tension but lacks the necessary resistance to erosion, the necessary stiffness characteristics and resistance to external influences and stresses to constitute a fish tape. The sheath provides wear resisting and anti-friction qualities which the core of itself lacks, and provides along with the core a selected or predetermined degree of stiffness or controlled flexibility for threading the tape through a conduit. The means employed on one end—to apply tension for pulling the tape and attached conductor—is provided by an integral loop which in case of breakage or other injury is renewable. The loop is integral with one end of the tape. A means for renewably bonding a head or pulling eye to the front end of the composite body of the tape is provided by a small diameter coupling which has an eye at the forward end of the tape for hitching thereto the conductor to be pulled through the conduit. Both the connection of the pulling eye to the front end of the body of the tape and the connection of the loop to the rear end of the body of the tape are renewable with simple tools and simple manipulation. This makes possible a long useful life, not possessed to the same degree by any known non-metallic fish tape.

4 Claims, 7 Drawing Figures

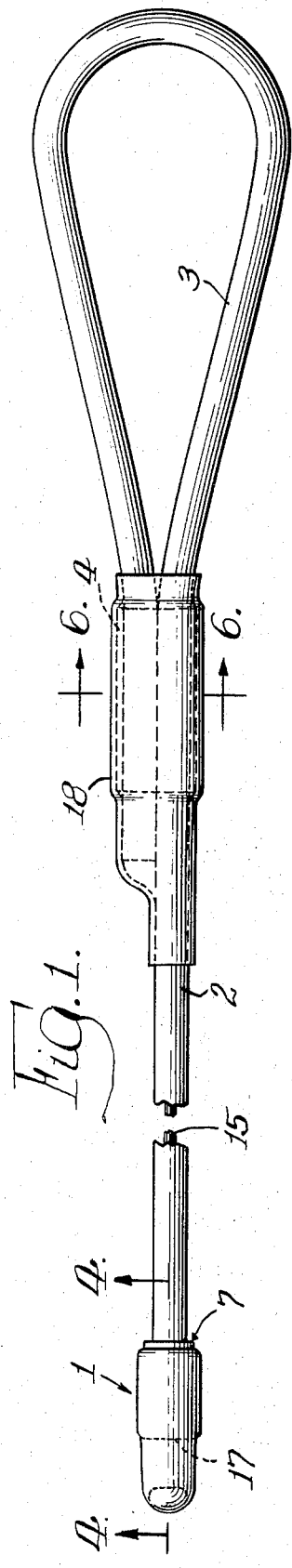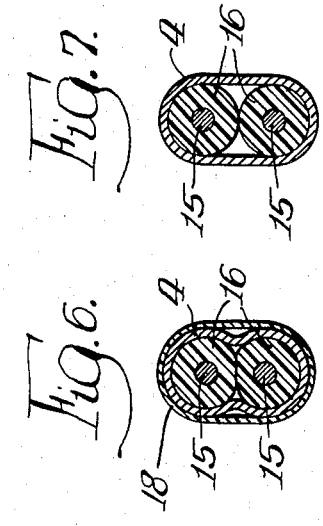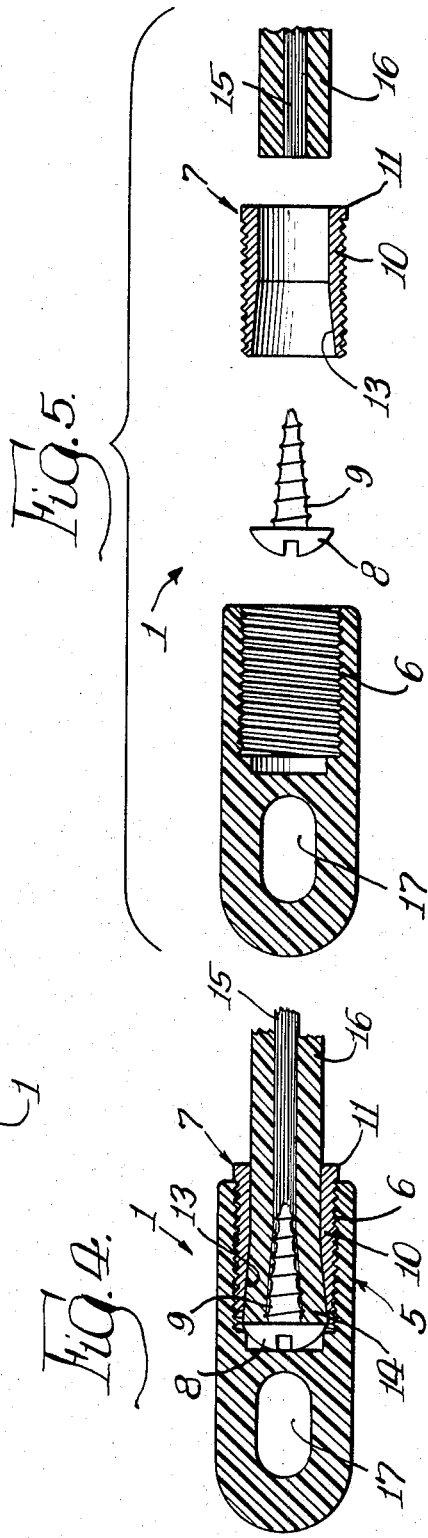

FISH TAPE

This invention relates to the art of threading electric conductor through conduits and the like. Instruments for performing this service are known; they are generally termed fish tapes. My invention provides an unobvious improvement in fish tapes.

FIELD OF THE INVENTION

Fish tapes for pulling conductors into conduits for electrical installations of light and power wires have long been known and the advantage of a nonconducting fish tape for this service is of the prior art as exhibited, for example, in the patent to Weitzel et al, U.S. Pat No. 3,102,715, of Sept. 3, 1963. The degree of flexibility desired for threading a fish tape through a ¾ inch conduit is well known in the art.

The prior art, however, has several drawbacks which are overcome in the present invention, one being that the durability of the device of the prior art leaves much to be desired particularly since the breaking of a single strand, exposed on the cordage product of the prior art, deteriorates the serviceability and life of the tape. A further problem of the prior art has been the failure of the eye to which the electrical conductor to be pulled is to be hitched for the pulling operation, being stranded and subjected to encounter with sharp edges and irregularities in the conduits, they suffer failure which renders the entire tape unserviceable.

Furthermore, the cost of manufacture of cordage product tapes considered in connection with the limited possibility of reuse after repair has been recognized as unfavorable, but not curable, heretofore.

OBJECTS OF THE INVENTION

The primary object of the invention is the provision of a fish tape of maximum ability, first, in its function of acting as a means for pulling a conductor into a conduit or the like, and second, in being repairable by the use of simple tools normally available to and operable by the workman, to reconnect the pulling eye member in case of breakage or disconnection of the same from the body of the tape, and third, being able to repair a break in or adjacent the pulling loop by the simple operation of crimping a metal hand to embrace the free end and adjacent part of the body of the tape to form a loop, and shrinking a band 18 of heat sensitive plastic over the joint. This latter band 18 completely covers and insulates the metal band or bands 4.

A further object is to provide strong and workable connections between the conductor attaching eye member at one end of the body and the loop or pulling eye at the other end of the body with high strength metallic connections exposing, however, the minimum conductive path in case of contact with live conductors.

A further object is to provide a fish tape having a minimum or no exposed metal parts.

A further object is to provide a fish tape which may be manufactured with a minimum of labor and equipment and with assurance of a controlled stiffness-flexibility-durability characteristic, and capable of being easily repaired in case of injury at either end.

THE DRAWINGS

Now in order to acquaint those skilled in the art with the manner of constructing and operating an embodiment of my invention, I shall describe and illustrate a specific embodiment of my invention.

FIG. 1 is a side elevational view of an embodiment of my invention (the central part of the tape being omitted);

FIG. 2 is an end view of the head assembly to which the conductor to be drawn may be attached;

FIG. 3 is a side elevational view of the head and connected end of the tape body taken at right angles to the view of FIG. 1 showing the eye through which the end of the conductor is threaded;

FIG. 4 is a sectional view taken on the line 4—4 of FIG. 1 looking in the direction of the arrows;

FIG. 5 is an exploded view of the head assembly shown in section in FIG. 4;

FIG. 6 is a transverse sectional view through the binding sleeve which unites the free end of the tape with the body part of the tape and the heat shrunk plastic sleeve over the junction, taken on line 6—6 of FIG. 1; and FIG. 7 shows in cross section the metallic shrinkable sleeve threaded upon the end and upon the adjacent run of the tape before crimping and thereby shrinking the metallic sleeve.

DESCRIPTION OF THE PREFERRED EMBODIMENT

The device of the invention is an assembly of parts into a unitary tape of a length suitable to perform the conductor insertion function, the length being suitably adapted to the length of the conduit into which a conductor is to be inserted. A longer tape may obviously be employed on a shorter circuit. The tape comprises essentially a head assembly 1 mounted on one end of a flexible cylindrical body 2, the end of which body remote from the head assembly is formed into an integral loop 3 by bending back the free end, as shown in FIG. 1, and anchoring the free end to the adjacent part of the body 2 by means of one or more shrinkable metal bands or sleeves 4 crimped upon the parallel runs embraced thereby. The overlapped end of the tape and the crimped metal sleeve and the plastic sleeve are streamlined and insulated by a tubular shroud 18 of plastic which is heat shrunk upon the members of the junction. The shroud 18 serves a multiple function. It holds the end which would otherwise be free against displacement, and avoids catching the loose end against adjacent objects. It also serves as electrical insulation against possible shorts or grounds which might be brought about by the metal sleeve 4 contacting charged electric conductors. The friction of the band or bands 4 with the surface of the embraced portions of the body is sufficient to permit the transmission of a strong pull upon the loop without displacing the said coupling band 4 or the heat shrunk plastic sleeve 18.

The head assembly which is shown in elevation in the three views of FIGS. 1, 2 and 3 is shown in longitudinal section in FIG. 4. The anchor portion 5 of the head assembly 1 (see FIG. 4) includes a cylindrical socket portion 6 which is internally screw threaded to receive the threaded ferrule 7 (see FIG. 5). The bottom of the socket provides a cylindrical recess for receiving and engaging the convex head 8 of tapered screw i.e., having a tapered screw threaded shank ending in a point, and having a round, substantially hemispherical slotted head with a flat base 9. The screw 9 may be of the form known in the art as a sheet metal screw, although its function in the present combination is different from the usual function of a sheet metal screw. The form, however, serves the purposes of the present invention and it is the form of the screw and its ready insertability and removability and its convex top and flat bottomed head to which reference is here made rather than to its otherwise function. The tape head member 5 which is made of insulation provides a recess for receiving the end of the tape including the head 8 of the screw 9 and it provides the internal threads 6 which cooperates with the external threads on the ferrule 10. The ferrule 10 has a flange 11 (see FIG. 5) which may be polygonal for engagement by a wrench or the like, or may be left cylindrical with or without knurling for engagement by the jaws of a pair of gas plyers or the like. The ferrule 7 may be turned on the threads by a spanner wrench, the outer end of the ferrule being then notched endwise to the end that the ferrule may be driven completely inside the threaded socket leaving no metallic part exposed, hence no opportunity for live conductors to become grounded or shorted. The flat planar shoulder or base formed at the junction of the screw head 8 and the threaded shank of the screw 9 engages the end of the plastic sheath 16. The endwise pressure of the body 16 against the screw 9, produced by the ferrule 10 is sustained by the bottom of the socket in the head 5. The flange 11 or axially extending notches (not shown) provides a means by which the ferrule 10 is forced tightly into the position shown in FIG. 4 where the ferrule, having the conical inner face 13 (see FIG. 5), engages the conical head 14 of the end of the composite tape member 2.

The body of the tape member 2 is constructed of a central core 15 consisting of a group of high strength polyester fibers each of a few thousandths of an inch in diameter. Preferably these fibers are arranged in parallel relationship to each other, that is, preferably not woven or twisted, and the polyethylene sheath 16 is extruded upon them. The sheath or jacket 16, being extruded, is applied to the stranded core under substantial pressure whereby the desirable surface adhesion between the plastic sheath and the stranded core is produced. The polyester core is composed of strands of excellent tensile strength, but of sufficient elasticity to permit stretching under tension to the desired degree.

The plastic jacket presents a low coefficient of friction to engagement with the walls of the conduit and it has sufficient toughness to avoid or minimize cutting on a sharp corner or rough surface with which the same comes into engagement in the course of its operations.

The head member 1 which is made of insulation has a transverse eye opening 17 of oblong form suitably rounded for the attachment of a conductor to be pulled into a conduit.

The assembly of the head 1 to the adjacent end of the body 2 is effected as follows. The diameter of the tqpe body 2 is substantially less than the internal diameter of the recess in the head member 1. This is to accommodate the entry of the expanded conical end portion 14. The prior expansion of the end of the body 2 is produced by the insertion of a conical pin namely the screw 9 in the central part of the end of the tape. Preferably this is effected by screwing a tapered screw 9 into the stranded polyester core as shown in FIG. 4. This progressively increases the diameter of the end of the core member as shown in FIG. 4. The ferrule 10, which has previously been threaded over the end and onto the body member, is now slid along towards the end which has been expanded into the form of a cone, and the interior conical surface 13 of the ferrule 10 engages the conical head produced by the insertion of the tapered screw 9, and the advance of the ferrule 10 on its threads into the socket in the head member 5 forces the end of the body 2 downwardly, and forces the head of the screw 8 against the bottom of the cup which is formed in the head member 1. Forcing the ferrule 7 down into the socket causes the conical inside surfaces of the ferrule to exert axial and radial pressures upon the enlarged conical end of the tape to provide a firm connection between these parts. The exposed ends of the ferrule 10 may be gripped by a pair of gas plyers or by a wrench, if suitable configuration is provided, to drive the conical ferrule home and to produce a strong connection between the head 1 and the body 2.

In the event of breakage or injury to the adjacent end of the body member 2, the ferrule may be released by unscrewing the same from the socket 6. This exposes the tapered pin or screw 8 which may then be removed allowing the end of the body 2 to be extracted from the ferrule 10. The injured part of the body 2 may be removed and a new end produced by cutting the same off square, threading the sleeve onto the end of the body, screwing the tapered screw 9 into position (as shown in FIG. 4), inserting the expanded end of the body 2 into the socket 6. The ferrule is then advanced on the threads in the head member 1 to clutch the expanded end of the body 2 (as shown in FIG. 4), whereby the connection of the head to the body 2 is effected. The pulling loop in addition to its utility as a convenient hand hold for pulling the tape and an attached wire endwise into a desired position provides a means for twisting the tape and attached conductor in entering the conduit as well as pulling the latter into place. In other words it serves as a crank to rotate the fish tape to a greater or less degree for finding its way inwardly of the conduit and allows the fish tape and attached conductor to be swung angularly on the axis of the body of the tape to help pass irregularities in the conduit.

In the event of injury to the pulling loop 3 which would require renewal or the same, the plastic shroud 18 is removed, the band or bands 4 which bind the free end of the body into the form of a loop, as shown in FIG. 1, may be cut or sawed away and to the extent that the remaining portion of the loop is sound, the end of the sound portion may be looped back into the form of a loop shown in FIG. 1, and one or more deformable metal bands 4 may be threaded over the body and end portions in parallel, as shown in FIG. 7, and then deformed by crimping the sleeve or sleeves 4 into the shape shown in FIG. 6 to bond the free end to the main adjacent body portion. The shrinkable plastc shroud is applied and the repair is completed.

The repairability of the fish tape of my invention may be availed of as above explained on several occasions, but even without the advantage of repairability, the tape is superior to devices of the prior art in cost, durability and ease of operation.

I claim:

1. A fish tape of the character described comprising an elongated cylindrical body consisting of a central longitudinal core of continuous fibers of high strength artificial resin, a tubular sheath of polyethylene plastic extruded upon and embracing said core, an eye of insulating material having screw threads by which it is removably mounted upon one end of said body, and a loop at the other end of the body formed by bending the free end portion of the body back upon and parallel to an adjacent portion of the body, a metallic binding sleeve crimped upon the free end portion and the adjacent parallel portion of the body and a heat shrinkable plastic sleeve of insulation embracing the free end and parallel portions of the body and the metallic binding sleeve which holds the end portion to the main portion of the body.

2. A fish tape comprising an elongated substantially cylindrical body of insulation of predetermined stiffness, said body comprising a highly flexible central longitudinal core of relatively small diameter consisting of parallel longitudinally extending synthetic fibers of high tensile strength and a flexible cylindrical unitary sheath of synthetic resin extruded upon and firmly embracing said fibers, said sheath of synthetic resin controlling the flexibility of said body, a substantially cylindrical conductor pulling eye member of insulation having at one end a substantially cylindrical longitudinally extending internally threaded socket in which one end of the cylindrical body of insulation is disposed, said pulling eye member having a pulling eye on the end opposite said socket, a metal screw having a head with a pointed and tapered shank screwed axially into the end of said elongated body of insulation in contact with said high strength central fibers, the entry of said tapered screw expanding the end of the cylindrical body into a head of outwardly tapered conical form, and an externally threaded cylindrical ferrule having an internal conical form adapted to engage and compress said conical head and being adapted to be driven on its threads inwardly of said socket in the pulling eye member to clamp said conical head of the cylindrical body of insulation into the socket of said pulling eye member.

3. The fish tape of claim 2 wherein said synthetic fibers of high tensile strength are composed of polyester resin and the unitary sheath of artificial resin consists of polyethylene, and said screw which has a tapered and pointed shank has a slotted convex head with a flat base.

4. A readily repairable fish tape comprising a body of selected length of cylindrical flexible insulating material consisting of a central core or small diameter fibers of a high tensile strength resin, a tubular sheath of flexible resin extruded upon and embracing said core of fibers, a terminal member of insulation having an eye at one end for attaching a conductor to be pulled, said member having a threaded socket and threaded clamping means cooperating with said socket to releasably clamp the end of the said cylindrical body of insulation concentrically inside said socket, a readily repairable pulling loop on the end of the body opposite that of the conductor pulling eye comprising a loop formed adjacent the end of the body remote from the conductor attaching eye, said loop comprising the terminal end of the cylindrical body laid back parallel to and in contact with the adjacent part of said body, a metallic sleeve crimped upon said parallel portions of the body to hold them together and a sleeve of heat shrinkable insulation embracing and covering the metallic sleeve and the adjacent terminal end of the body, said loop providing a hand hold for moving the fish tape endwise and rotarily.

* * * * *